(12) United States Patent
Suomi et al.

(10) Patent No.: US 6,615,709 B1
(45) Date of Patent: Sep. 9, 2003

(54) METHOD FOR DETECTING CONTAMINATION AND/OR DAMAGING OF A FACE THAT RUNS THROUGH A NIP OR NIPS IN A CALENDAR FOR PAPER

(75) Inventors: Eero Suomi, Hämeenlinna (FI); Tapio Mäenpää, Helsinki (FI); Arto Karjalainen, Kajaani (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/554,640

(22) PCT Filed: Nov. 3, 1998

(86) PCT No.: PCT/FI98/00850

§ 371 (c)(1),
(2), (4) Date: May 17, 2000

(87) PCT Pub. No.: WO99/25921

PCT Pub. Date: May 27, 1999

(30) Foreign Application Priority Data

Nov. 17, 1997 (FI) .................................................. 974255

(51) Int. Cl.[7] .............................................. B30B 11/22
(52) U.S. Cl. ......................... 100/41; 100/99; 100/161; 100/176
(58) Field of Search ......................... 100/35, 176, 168, 100/41, 155 R, 161, 159, 327, 99

(56) References Cited

U.S. PATENT DOCUMENTS

| | | | | |
|---|---|---|---|---|
| 3,677,072 A | * | 7/1972 | Weichbrodt et al. | 340/683 |
| 3,699,806 A | * | 10/1972 | Weichbrodt | 73/593 |
| 4,007,630 A | * | 2/1977 | Noda | 73/593 |
| 4,510,859 A | * | 4/1985 | Berry | 100/162 R |
| 4,896,537 A | * | 1/1990 | Osborne | 324/207.22 |
| 5,771,794 A | * | 6/1998 | Benizri et al. | 100/171 |

FOREIGN PATENT DOCUMENTS

| | | | |
|---|---|---|---|
| DE | 4340700 | * | 6/1995 |
| EP | 0075620 | | 4/1983 |
| FI | 92771 | | 9/1994 |
| JP | 62250295 | | 10/1987 |
| JP | 2061192 | | 3/1990 |
| JP | 3146790 | | 6/1991 |

* cited by examiner

*Primary Examiner*—Allen Ostrager
*Assistant Examiner*—Shelley Self
(74) *Attorney, Agent, or Firm*—Steinberg & Raskin, P.C.

(57) ABSTRACT

The invention concerns a method for detecting a contamination and damaging of a face (10) that runs through a nip or nips ($N_1 \ldots N_{10}$) in a calendar for paper. In the method vibrations occurring in connection with the constructions (18, 100) of a calendar are detected and processed. The vibrations are detected by at least one vibration detector (40; 41 ... 46; 41a ... 46a, 41b ... 46b) fitted in connection with the bearing supports of calendar rolls (11 ... 16) or in connection with constructions (18, 100) related to said bearing supports. By the way of these vibration detectors the calendar roll(s) (11 ... 16) is/are identified from which the vibration derives. In the method, it is possible to observe the rotation of all of the rolls to be monitored and to measure vibration from any suitable point whatsoever, for example from the frame (100) of the machine, by employing at least one vibration detector (40), the time ($T_r$) of the cycle of the vibration signal obtained from said detector(s) being compared with the numbers of revolutions of the rolls to be monitored. In this way, the source of the disturbance is determined, and action is taken in order to eliminate the disturbance.

11 Claims, 2 Drawing Sheets

METHOD FOR DETECTING CONTAMINATION AND/OR DAMAGING OF A FACE THAT RUNS THROUGH A NIP OR NIPS IN A CALENDAR FOR PAPER

FIELD OF THE INVENTION

The invention concerns a method for detecting contamination and/or damaging of a face that runs through a nip or nips in a calender for paper, in which method vibrations occurring in connection with the constructions of a calender are detected and processed.

The present invention is related to calenders for paper, in particular so-called soft calenders and supercalenders, in which soft-coated rolls are used, which are particularly susceptible of damage.

A particularly advantageous embodiment of the present invention is related to monitoring of the condition of soft-coated calender rolls in view of detecting their surface damage at a sufficiently early stage and, thus, in view of permitting prevention of damage in advance.

BACKGROUND

As is known from the prior art, calenders comprise two or more hard-faced and/or soft-faced calender rolls, which form a calendering nip or nips with each other, through which nip/nips the paper web to be treated is passed. In particular, rolls with soft faces, such as paper rolls or equivalent in supercalenders and rolls provided with soft coatings, in particular polymer coatings, in what is called soft calenders, are susceptible of damage. The reason for the damage is frequently contaminations, such as local fibre strings, which cause a pressure impact when they pass through the nip, which impact loads the soft coating on the calender roll and first causes its heating and, in the long run, a permanent deformation in the coating and damage. Similar deformations and, damage may also occur in metallic faces of calender rolls and in the faces of bands running through calendering nips.

In respect of the particular problems that constitute the starting point of the present invention, the following is stated. The polymer-coated rolls in prior-art calenders endure uniform loading and wear well, but they are damaged very easily is some limited, even small area is heated even to a relatively little extent, for example, to a temperature higher than its environment. Owing to the high thermal expansion coefficient and to the very poor thermal conductivity of polymers, such an even little area expands rapidly and is heated further to such high temperatures that it can be deformed. If the coating on the roll has been made of so-called thermosetting resins, on re-melting it, at the same time, loses its original properties. A heating reaction of the sort described above can be caused, for example, by a little piece of paper, fibre string or "clod", or a stain separated from the coating on the paper, which adheres to the roll face and which, when entering into a calendering nip, causes a local yielding of the coating more intensive than in the environment, which heats the roll coating unevenly.

Prevention of local contamination, for example, by means of constant doctoring is, as a rule, not reasonable, neither economically nor in view of optimal quality of paper, for most of the polymer coatings that are.in use do not tolerate rubbing very well, in which case the preventive cleaning itself might wear the coating to a greater extent than the calendering proper does.

However, if contaminations could be detected early enough, for example, a cleaning doctor or some other device that cleans the roll face could be operated during short periods of time without damaging the roll coating as a result of constant or frequently repeated doctoring. In such a case, the service lives of soft-faced calender rolls could be extended to a considerable extent.

As is known from the prior art, for monitoring the condition of calender rolls, in particular of soft-faced rolls, thermometers traversing in the cross direction of the machine have been used, by whose means the temperature of the coating is monitored. In said temperature monitoring application and in corresponding other prior-art systems, problems arise from the fact that the resilient roll coating, whose temperature is monitored, is, as a rule, at least to some extent electrically insulating. Thus, in the partly rubbing contact between the web and the coating, quite high charges of static electricity arise in the faces of the roll coating and of the relatively dry paper web. These charges tend to be discharged along the available routes with the lowest resistance. A thermographic camera must often be installed so that it projects from its support construction, in which case said static electric charges find exactly the thermographic camera as the easiest route of discharge, in which connection the sensitive electronic system of the thermographic camera is subjected to quite high voltages, and it must be protected specifically against such voltages.

Even if monitoring of the temperature of the face of a calender roll usually permits detecting of a local raised temperature resulting from an excessive load applied to the coating or from a local inner non-homogeneity at a sufficiently early stage, this requires installation of quite heavy, expensive and spacious equipment in the vicinity of the roll to be monitored. In particular, congestion of space causes great difficulties in connection with multi-roll treatment devices, at which every device that is not included in the web treatment process proper makes the maintenance and servicing of the device more difficult.

As is also known from the prior art, DE 43 40 700 discloses a method for detecting contamination or damages in a calender roll by detection of vibrations with vibration sensors. Damaged rolls are replaced in accordance with detected information to stop further damage in a papermaking process.

OBJECTS AND SUMMARY OF THE INVENTION

The object of the present invention is to provide a method by whose means contamination and/or damage in faces of rolls that form a calendering nip or nips and/or in faces of bands that run through nips can be monitored efficiently and by means of relatively simple devices that require little space.

It is a further object of the invention to provide a method in which the operations to be controlled based on the monitoring of the face running through the nip can be arranged to be so quick that, as a rule, permanent substantial damage does not have time to be produced in the face concerned before cleaning operations or equivalent have been started.

It is a further object of the invention to provide a method by means, of whose application, when necessary, the cleaning of the face running through the nip can be applied sufficiently precisely expressly to the area that has been noticed to be contaminated, whereby economies can be obtained in respect of the medium and the energy used for the cleaning. In some cases, owing to the invention, the cleaning equipment can be dimensioned so that its capacity is lower than in the prior art.

In view of achieving the, objectives stated above and those that will come out later, the method in accordance with the invention is mainly characterized in that said vibrations are detected by means of at least one vibration detector fitted in connection with the bearing supports of calender rolls or in connection with constructions related to said bearing supports, by means of which vibration detector(s) the calender roll(s) is/are identified from which the vibration derives.

In a preferred embodiment of the invention, on the bearing housings of the calender rolls or at least on a part of said bearing housings and/or on the roll frames, at least one acceleration detector which measures vibration of the calender roll or a strain gauge detector which measures deformations arising from vibration or other, equivalent detectors is/are fitted. The measurement signals from these detectors.are monitored and analyzed so that the portion of the measurement signal that arises from rotation and unbalance of the rolls is "filtered" off, and the development of the portion that arises from the geometry of the roll face is monitored. When the signal to be monitored reaches a predetermined level or when its spectrum is placed within the measurement window, the control system reports this further, and action can be taken either to replace the roll or to eliminate the source of disturbance.

By means of the system of the present invention, vibrations of the faces of calender rolls to be monitored are, in a way, "listened to" and, to the necessary extent, the site of origin of the vibrations is located so that efficient action can be taken sufficiently quickly in order to eliminate the cause of the vibration and/or to prevent further damage.

In the invention, the locating of the source of disturbance can also be carried out so that the rotation of all or several of the rolls to be monitored is observed and that vibration is measured from any suitable point whatsoever, for example from the frame of the machine. By comparing the measured vibration signal, preferably the cycle time of its repetition, with the measured speeds of rotation of the different rolls, it is possible to determine the source of the disturbance and to take action in order to eliminate the disturbance either by cleaning the roll or by replacing the roll before it is damaged.

By means of a monitoring system that applies the present invention, it is possible to create such information data bases by whose means the optimal moment of replacement of the rolls can be determined when the seriousness of the damage that has resulted in replacement of a roll is classified and stored in the memory in connection with replacement of each roll. In such a case, by means of history data, it is possible to identify the seriousness of a disturbance and to take action at the correct time.

By means of the present invention, it is possible to eliminate the problems discussed above by abandoning direct measurement of the surface temperature of the roll, by indirectly monitoring local impurities on rolls and changes in geometry on the basis of vibrations produced by them.

Advantages of the present invention, as compared with the prior-art procedure, are the following:

In the most advantageous embodiment of the invention, it is possible to locate the soft-faced calender roll, in particular a polymer-coated roll, that has been contaminated or deformed, so that the roll can be cleaned, for example doctored, before it has been damaged and become unusable, or, if necessary, a damaged roll can be replaced so that further damage or longer interruptions of production can be avoided.

The invention permits monitoring of the calender rolls so that, in the area of the roll frame, it is unnecessary to construct a measurement equipment provided with a separate support construction, in which case considerable economies of space are obtained.

The invention also permits locating of a calender roll that causes a disturbance or, if necessary, of an area of said roll by means of relatively simple devices and algorithms.

The invention can be connected as a part of the general system of monitoring of the condition of the calender, and the invention can utilize the assemblies of detectors already installed in the area of bearings for the purpose of monitoring the condition of bearings, or, alternatively, the detectors installed in order to carry out the present invention in view of monitoring the condition of the roll face can also be utilized for predicting and/or monitoring of bearing damage.

The invention is not confined to monitoring of disturbance arising from changes in temperature related to local surface temperatures on the calender rolls alone, but the system of the present invention already reacts at such an earlier stage in which a contamination has adhered to the roll face which would later additionally cause a locally raised temperature.

Further, it can be considered to be an advantage of the invention as compared with a thermographic camera that the system of the invention can, if necessary, be configured so that it constantly monitors the portion of the roll across the entire width of the treatment nip and locates the cause of disturbance even both in the axial direction of the roll and in a vertical cross section of the roll in the direction of its circumference.

When the monitoring system of the invention is used in a calender with several nips, for example in a supercalender, all the rolls in the calender, or at least the rolls that are particularly susceptible of surface damage, in particular soft-faced rolls, are provided with a detector system in accordance with the invention, in which case the source of unusual vibrations can be located exactly at a contaminated and/or damaged roll so that it is possible to start eliminating the contaminations or to replace the damaged part so that further damage and production losses are avoided.

BRIEF DESCRIPTION OF THE DRAWINGS

In the following, the invention will be described in detail with reference to some exemplifying embodiments of the invention illustrated schematically in the figures in the accompanying drawing, the invention being by no means strictly confined to the details of said embodiments.

DETAILED DESCRIPTION OF THE INVENTION

To begin with, reference being made to FIG. 2, a simplified exemplifying embodiment will be described as a particularly advantageous environment of application of the invention.

Figure 2:
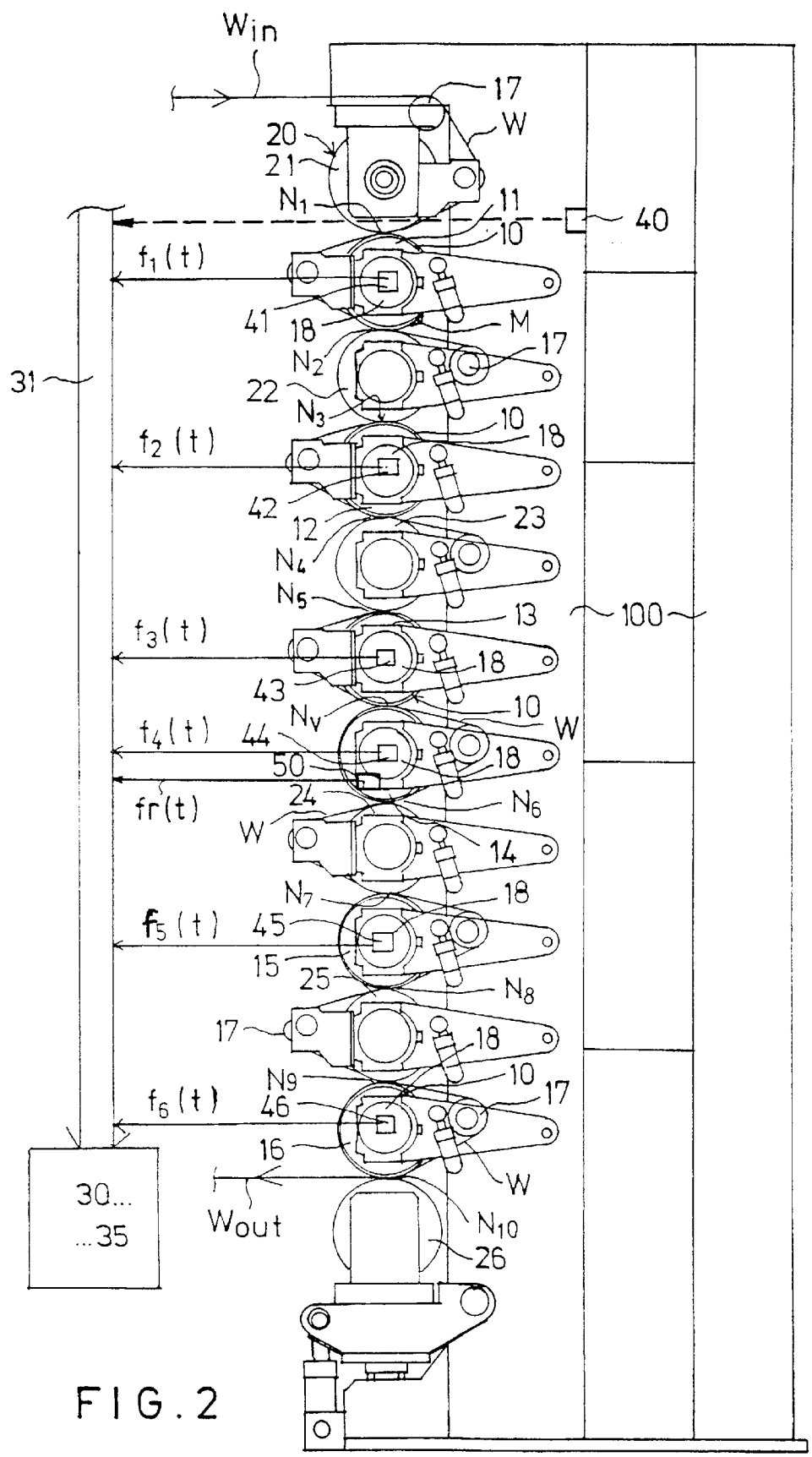
FIG. 2 is a schematic side view of a 10-nip multi-roll calender as a preferred environment of application of the present invention.

As is shown in FIG. 2, the multi-roll calendar comprises a frame part 100, on which a stack of calender rolls has been mounted. The stack of calender rolls comprises ten calendering nips $N_1 \ldots N_{10}$ placed one above the other, which nips are loaded by means of loading devices in themselves known. The paper web W to be calendered enters into the calender in the direction fo the arrow $W_{in}$ and departs from the calender after the last nip $N_{10}$ in the direction fo the arrow $W_{out}$. Being guided by the guide rolls 17, the paper web W the calendering nips $N_1 \ldots N_{10}$ proper and through the reversing nip $N_v$. In the calender, there are six metal rolls 21, 22, 23, 24, 25, 26 provided with hard and smooth coatings 20 and six rolls 11, 12, 13, 14, 15, 16 provided with soft polymer coatings 10. The rolls with the soft and hard-faced coatings 20 and the soft-faced 10 rolls are placed in the stack of rolls alternatingly so that two soft rolls 13, 14 have been fitted one after the other to reverse the side of the paper web W that is to be calendered more intensively. The condition of the rolls 11 . . . 16 provided with soft coatings 10 is monitored by means of vibration detectors 41, 42, 43, 44, 45, 46 fitted on one of the bearing support 18 of each of said rolls. By analyzing the signals $f_1(t) \ldots f_6(t)$ obtained from said vibration detectors 41 . . . 46, it is possible to detect damage in the soft roll faces 10 and local contamination M of the rolls 11 . . . 16 before the polymer coating 10 is damaged and becomes irreparable.

As is shown in FIG. 2, the signals $f_1(t) \ldots f_6(t)$ which represent the vibrations and which are received from the vibration detectors 41 . . . 46 fitted in connection with one of the bearing supports 18 of each of the rolls 11 . . . 16 are passed along the bus 31 into the monitoring system 30 . . . 35 applied in the invention, an exemplifying embodiment of said system being described later in more detail with reference to FIG. 1.

In FIG. 2, the so-called reversing nip NV is formed between two soft-faced rolls 13 and 14. Since, as a rule, the rolls 13 and 14 have different diameters, as compared with one another, a disturbance can be located in one of the rolls 13/14 by monitoring the cycle time $T_r$ of the disturbance. In such a case, a vibration detector 43/44 is needed in one of the rolls 13/14 only. This embodiment of the invention can also be generalized so that, for example, in a calender in which all the rolls have different diameters, as compared with each other, it is possible to employ just one vibration detector 40 and one or several impulse detectors 50, and the disturbance can be located exactly in the contaminated roll based on the cycle times $T_r$ of vibrations.

Figure 1:
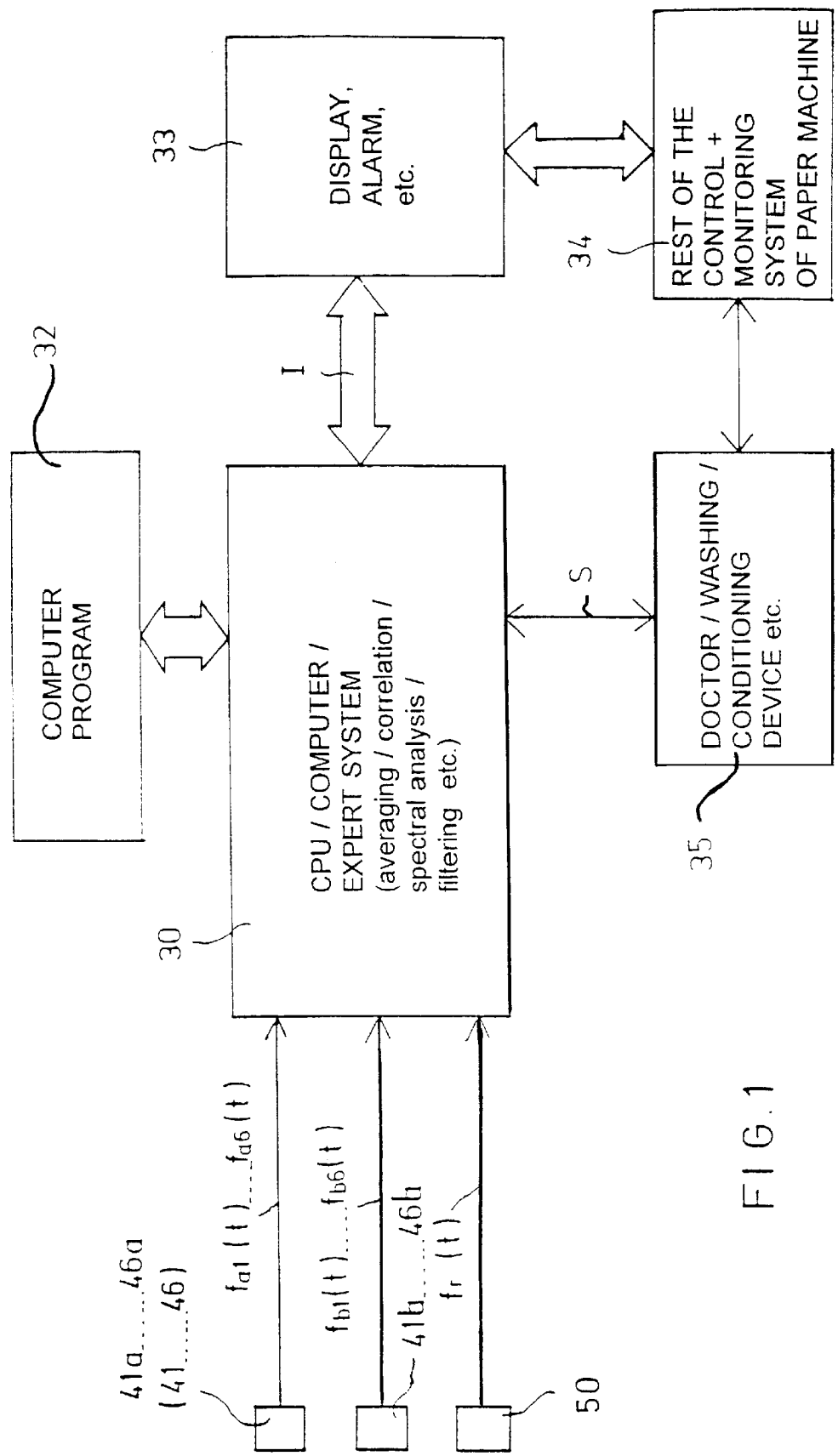
FIG. 1 shows a simplified block diagram illustrating the monitoring system in accordance with the invention.

FIG. 1 is a schematic illustration of such an embodiment of the system of the present invention in which there are pairs of vibration detectors $41a \ldots 46a$ and $41b \ldots 46b$ at both of the opposite bearing supports 18 of all of the soft calender rolls 11 . . . 16. The reference letters a and b refer to opposite sides of the calender. Thus, in this respect, the illustration in FIG. 1 differs from FIG. 2, in which vibration detectors 41 . . . 46 have been shown to be fitted in connection with one of the bearing supports 18 only at each of the soft rolls 11 . . . 16. Both in FIG. 1 and in FIG. 2, an impulse detector 50 is shown, from which the synchronization signal $f_r(t)$ is obtained, which is utilized in a way that will be described in more detail later.

From the pairs of vibration detectors $41a, 41b \ldots 46a, 46b$ shown in FIG. 2, the signals $fa_1(t) \ldots fa_6(t)$ and $fb_1(t) \ldots fb_6(t)$ are obtained, which are passed to the unit 30. Also, to the unit 30, a signal $f_r(t)$ is passed from the impulse detector 50 placed in connection with a calender roll, which signal is formed, for example, out of a short voltage pulse coming on each revolution of the roll, the cycle time T of said pulse illustrating the circumferential speed of the rolls. In the unit 30, it is also possible to carry out spectral analysis of the signals $f_a(t)$ and $f_b(t)$, for example, by means of Fourier analyzers in themselves known. In this way, in addition to locating the disturbance, it is also possible to draw conclusions concerning the nature and the degree of seriousness of the disturbance. The signal $f_r(t)$ can be used for synchronization of the measurements and for measurement of the speed of rotation of the rolls in the monitoring system in accordance with the invention, which will be described in more detail later.

The vibration detectors 41 . . . 46 are preferably acceleration detectors, but piezo-electric detectors or transition detectors, such as strain gauge detectors, can also be used. By means of these detectors, pressure impacts of quite a high frequency, arising, for example, from fibre strings M, in the set of calender rolls or in a corresponding other fact to be monitored, such as the face of a transfer belt or a press felt, are measured. Said pressure impacts produce mechanical vibrations present as a longitudinal wave movement, the substantial energy of said vibrations being, as a rule, in the sound frequency range. Besides by impurities, for example local fibre strings M, vibrations can also be caused by damage in the coatings on the rolls, which damage is present as local areas of discontinuity or as deformations in the roll faces, in particular in a soft coating 10 susceptible of damage. For example, as is shown in FIG. 2, when a fibre string M present on the soft polymer coating 10 on the first soft roll 11 passes through the second nip $N_2$, it produces a clearly distinguishable signal $f_1(t)$, which is transferred through the bus 31 into the system 30 . . . 35 illustrated in FIG. 1.

The signals $f_a(t)$ and $f_b(t)$ detected by said pairs of detectors are averaged in the unit 30, in which, moreover, the phase difference $\phi$ between the signals $f_a(t)$ and $f_b(t)$ is measured. This phase difference $\phi$ is illustrated, for example, by the difference $\Delta t$ between the travel times of the vibrations, which is directly proportional to $\phi$. A corresponding difference $\Delta t$ between the travel times can be detected by means of pairs of detectors. Based on the difference $\Delta t$ between the travel times described above, the location of the fibre string M in the axial direction of the rolls can be determined.

Based on the signal $f_r(t)$ of the pulse detector 50, it is possible to determine the phase angle $\alpha_m$ at which the fibre string M is placed from the reference plane determined by the impulse detector 50, in which reference plane the central axis of the roll is placed. Said angle coordinate $\alpha$ can be determined based on the following equation:

$$\alpha_m = \frac{360° \cdot Tr}{T}$$

wherein Tr=time of delay of the detecting of the vibration caused by the fibre string M, and T=cycle time of revolution of the roll.

The definition given above is based on the fact that the speed c of propagation of vibrations in the metal parts 11 . . . 16 of the rolls is considerably higher than $v_k$=circumferential speed of the rolls, ($c \gg v_k$). Thus, it is possible to determine both coordinates of the fibre strings M, i.e. the coordinate in the axial direction of the roll, and the angle coordinate perpendicular to same.

In the unit 30 shown in FIG. 1, the signals $f_a(t)$ and $f_b(t)$ are averaged, and their phase difference $\phi$ is measured. In the measurement of the phase difference $\phi$, it is also possible to employ the technique of correlation of the signals $f_a(t)$ and $f_b(t)$. In addition to measurement of the phase difference $\phi$, in the unit 30, it is also possible to carry out spectral analysis of the signals $f_a(t)$ and $f_b(t)$, and on the basis of said analysis, it is possible to draw conclusions concerning the nature of the disturbance. The unit 30 can include a processor (CPU) or a computer, whose operation is controlled by a computer program 32 prepared for the purpose. From the unit 30, information I is received, which is passed to the display monitor 33, which displays the appropriate display data for the operation supervisor and possible alarms, if any. Further, based on a signal s received from said unit 30, the devices 35 of cleaning and conditioning of the calender rolls can be controlled so that the cleaning operations, for example doctoring and/or water or steam jets, are applied to the contaminated roll 11 . . . 16 or even in the axial direction of the roll expressly to the locations of the impurities, and in this way the cleaning can be made more efficient and such that it wears the roll face less and consumes less cleaning medium and energy. Further, the unit 30 can be connected, preferably interactively, with the rest of the control and monitoring system 34 of the calender so as to operate synergically together with said system.

In the method of the present invention, the measurement signals can be synchronized by means of the speed of rotation of the calender rolls, which is obtained by means of the signal $f_r(t)$ and by means of the impulse detector 50. The system in accordance with the invention can operate, for example, so that, when the detector 50 by-passes the trigger point and gives an impulse, the measurement of vibration described above is started, the time used for a cycle of said measurement being invariable. After the cycle of measurement, the next triggering of the detector 50 is waited for, and a new cycle of measurement is started. These measurement cycles of invariable length are stored as a sufficient number, and the average values of the measurement signals $f_a(t), f_b(t)$ are computed. The measurement of the measurement signals $f_a(t)$ and $f_b(t)$ and of the synchronization signal $f_r(t)$ can also be carried out continuously, for example for a period of about 1 minute, after which the program 32 carries out the computing of a synchronized time average.

The pressure impacts arising from local impurities, such as fibre strings M, and the signals $f_a(t)$ and $f_b(t)$ detected from same are, as a rule, of relatively high frequency. Since vibrations arising, e.g., from unbalance of rolls or from corresponding other reasons are at a considerably lower frequency, they can be filtered off by means of high-pass filters in the unit 30 so that they do not interfere with the observations in accordance with the invention. By employing means in themselves known in the processing of the signals, such as band-pass filtering or correlation technique, it is possible to reduce the effects of the "noise" interfering with the measurements in accordance with the present invention.

Even though, above, it has been described that the coordinates of location of impurities M on the mantles of the rolls are measured both in the axial direction and in the circumferential direction, the invention can, of course, also be applied so that just one of the coordinates is detected.

The scope of the invention also includes applications in which the coordinates of the cause of the vibration are not at all determined, but exclusively the roll is determined, in particular.a soft-faced roll 11 . . . 16, and in FIG. 2 expressly the first soft roll 11, in connection with which the contamination M is present and to which, thus, the cleaning operations, such as doctoring by means of the devices 35, are applied.

As said devices 35 for cleaning and/or conditioning of the roll face or of the face of a corresponding band or felt, it is possible to use doctors in themselves known and/or, for example, nozzle devices of the sort described in the U.S. Pat. No. 5,603,775, which traverse in the axial direction of the roll and which spray a cleaning medium.

In a preferred embodiment of the invention, which has been sketched in FIG. 2, the doctor is controlled to clean expressly the roll, the roll 11 in FIG. 2, on whose soft face 10 a contamination M has been detected.

In accordance with the present invention, a source M of disturbance can also be located so that the rotation of all or several rolls to be monitored is observed, which rolls have, as a rule, different diameters, as compared with one another, and vibration is measured from any suitable point whatsoever, for example from the frame 100 of the machine, by means of at least one vibration detector 40. In such a case, the disturbance M can be located on a contaminated roll by comparing the cycle time $T_r$ of the repetition of the measured vibration with the speeds of rotation of the rolls measured by means of the detectors 50. Thus, it is possible to take action in order to eliminate the disturbance either by cleaning said contaminated roll or by replacing said roll before further damage is produced. In the unit 30, it is possible to collect and to create information data bases by whose means it is possible to determine the optimal time of replacement of the different rolls, for example, by classifying the seriousness of the disturbance and by, in connection with each replacement of roll, storing the necessary data in the memory of the system 30. Thus, a docile system 30 is produced, and the seriousness of a disturbance can be in identified by means of the history data collected in said system, and action can be taken at the correct moment.

When detectors fitted in connection with revolving mantles of calender rolls are employed in stead of, or in addition to, stationary vibration detectors, the transfer of data from the mobile detectors can be arranged in ways in themselves known. For the transfer of measurement signals $f_a(t)$, $f_b(t)$ and $f_r(t)$ from revolving rolls, a number of different solutions are known from the prior art, which can be applied in connection with the present invention. These prior-art solutions include various glide rings and transfer of signals by the radio. Glide rings are possible, but they are often susceptible of disturbance, and typically they require an abundance of space on the roll axles. For wireless transfer of signals, radio apparatuses are available commercially. The prior-art solutions related to said transfer of signal are not described in more detail in this connection, but in their respect, reference is made, by way of example, to the patent application EP-A1-0075620 and to the applicant's FI Patent 92,771.

In the following, the patent claims will be given, and the various details of the invention can show variation within the scope of the inventive idea defined in said claims and differ from what has been stated above by way of example only.

What is claimed is:

1. A method for detecting contamination and damage of a roll face (10) in a calender for paper, comprising the steps of:

detecting and processing vibrations occurring in connection with a frame part (100) and a bearing support (18) of a calender;

providing at least one vibration detector (40; 41 . . . 46; 41a . . . 46a, 41b . . . 46b) for detecting said vibrations, wherein said at least one vibration detector is in connection with the bearing supports of calender rolls (11 . . . 16) and in connection with the frame part (100) related to said bearing supports, by means of which vibration detector(s) the calender roll(s) (11 . . . 16) is/are identified from which the vibration derives;

wherein vibrations in the roll frame and roll bearings of a roll or rolls that forms/form a calendering nip or nips ($N_1 \ldots N_{10}$) are detected by means of at least one pair of detectors, and that the location of the source (11) of disturbance in the axial direction of said roll is determined based on the phase difference ($\phi$) of the vibrations arriving in the different detectors (41 . . . 46) in a pair of detectors (41a, 41b . . . 46a, 46b); and wherein the condition of the bearings in the calender is monitored by the detectors (41 . . . 46) being placed in connection with the bearings of the rolls (11 . . . 16) to be monitored.

2. A method as claimed in claim 1, wherein the rotation of several rolls to be monitored is observed, and vibration is measured from a point from the frame part (100) of the calender, and that at least one vibration detector (40) is employed, and the cycle time (Tr) of the vibration signal obtained from said detector(s) is compared with the speeds of rotation of the rolls to be monitored, and thereby the source of the disturbance is determined, and action is taken to eliminate the disturbance.

3. A method as claimed in claim 1, wherein, in connection with the bearing supports (18) of the soft-faced (10), being polymer-coated, rolls (11 . . . 16) in a stack of the calender rolls (11 . . . 16, 21 . . . 26), or in connection with constructions (100) related to said bearing supports, said vibration detector(s) (40; 41 . . . 46) has/have been fitted, by whose means the soft face calender roll (11 . . . 16) is determined whose soft coating has been contaminated and damaged.

4. A method as claimed in any of the claims 1 wherein the method is applied in a multi-roll calender, in which there are alternating hard-faced (20) metal rolls (21 . . . 26) and corresponding soft-coated, being polymer-coated(10) rolls (11 . . . 16)placed one above the other, which rolls from calendering nips ($N_1 \ldots N_{10}$) with each other, and that, in connection with the bearing supports (18) of said soft-faced (10) calender rolls (11 . . . 16), vibration detectors (41 . . . 46) have been fitted, from which vibration signals ($f_1(t) \ldots f_6(t)$) have been passed to the units (30 . . . 35) which process vibrations.

5. A method as claimed in any of the claims 1 wherein the method is applied in a calender in which there is a reversing nip ($N_v$) formed by two soft calendering rolls (13, 14), that at each of said soft-faced rolls (13,14), which have different diameters, as compared with one another, there is a detector (50) which monitors the speed of rotation of the roll, that a vibration detector (43/44) is fitted in connection with one of said rolls (13, 14) only, and that a disturbance is located as being present on either one of said rolls (13, 14) by making use of the cycle time ($T_r$) of repetition of the disturbance.

6. A method as claimed in claim 1 wherein the location of the source of disturbance (M) in the circumferential or machine direction of the face (10) to be monitored is determined by making use of an impulse detector (50) that records the revolutions of the face (10) to be monitored and by making use of the point of time of the impulse obtained from said detector as compared with the time of detecting of the disturbance (M).

7. A method for detecting contamination and damage of a roll face (10) in a calender for paper, comprising the steps of:

detecting and processing vibrations occurring in connection with a frame part (100) and a bearing support (18) of a calender;

providing at least one vibration detector (40; 41 . . . 46; 41a . . . 46a, 41b . . . 46b) for detecting said vibrations, said at least one vibration detector is in connection with the bearing supports of calender rolls (11 . . . 16) and in connection with the frame part (100) related to said bearing supports, by means of which vibration detector (s) the calender roll(s) (11 . . . 16) is/are identified from which the vibration derives; and separating, by means of a high-pass filter and by means of a band-pass filter, the interfering signals placed outside the measurement window and arising from unbalance of rolls (11 . . . 16), fabrics and bands and from other vibrations from the signals ($f_a(t)$, $f_b(t)$) detected by means of the vibration detectors.

8. A method as claimed in claim 1 wherein in the method, a certain amount of measurement signals are collected in the memory, which signals are averaged, and, based on the signals thus obtained, at least one coordinate of the source of disturbance on the face to be monitored is determined.

9. A method for detecting contamination and damage of a roll face (10) in a calender for paper, comprising the steps of:

detecting and processing vibrations occurring in connection with a frame part (100) and a bearing support (18) of a calender;

providing at least one vibration detector (40; 41 . . . 46; 41a . . . 46a, 41b . . . 46b) for detecting said vibrations, said at least one vibration detector is in connection with the bearing supports of calender rolls (11 . . . 16) and in connection with the frame part (100) related to said bearing supports, by means of which vibration detector (s) the calender roil(s) (11 . . . 16) is/are identified from which the vibration derives; and wherein, based on the coordinates of location of the sources of disturbance, the devices (35) that clean the face (10) to be monitored are controlled so that they apply the cleaning operation of doctoring, to a soft-faced roll (11 . . . 16).

10. A method as claimed in claim 1 wherein the signals received from the vibration detectors are subjected to a spectral analysis, on whose basis conclusions are drawn concerning the nature of the disturbance and/or effects of outside sources of disturbance are reduced.

11. A method for detecting contamination and damage of a roll face (10) in a calender for paper, comprising the steps of:

detecting and processing vibrations occurring in connection with a frame part (100) and a bearing support (18) of a calender;

providing at least one vibration detector (40; 41 . . . 46; 41a . . . 46a, 41b . . . 46b) for detecting said vibrations, said at least one vibration detector is in connection with the bearing supports of calender rolls (11 . . . 16) and in connection with the frame part (100) related to said bearing supports, by means of which vibration detector (s) the calender roll(s) (11 . . . 16) is/are identified from which the vibration derives;

passing the vibration signals and the signal ($f_r(t)$) that indicates the by-passing and the speed of the reference point on the face (10) to be monitored to a unit (30) or to a computer, which is provided with a program (32) that controls the measurement and analyzes the measurement results, and that from said unit (30) the measurement results are passed to a display and alarm means (33); and wherein, in said unit (30), a data base is collected and created, by whose means the optimal times of replacement of different rolls are determined by classifying the seriousness of the disturbance and by storing the necessary data in the memory of the system (30) in connection with each replacement of roll.

* * * * *

UNITED STATES PATENT AND TRADEMARK OFFICE
CERTIFICATE OF CORRECTION

PATENT NO. : 6,615,709 B1
DATED : September 9, 2003
INVENTOR(S) : Eero Suomi et al.

It is certified that error appears in the above-identified patent and that said Letters Patent is hereby corrected as shown below:

<u>Title page, Item [54] and Column 1, lines 1-3,</u>
Title should read as -- METHOD FOR DETECTING CONTAMINATION AND/OR DAMAGING OF A FACE THAT RUNS THROUGH A NIP OR NIPS IN A CALENDER FOR PAPER --.

Signed and Sealed this

Third Day of February, 2004

JON W. DUDAS
*Acting Director of the United States Patent and Trademark Office*